United States Patent [19]

von Rymon Lipinski

[11] 4,172,154

[45] Oct. 23, 1979

[54] PROCESS OF PREPARING A BAKED FLOUR-CONTAINING PRODUCT

[75] Inventor: Gert-Wolfhard von Rymon Lipinski, Frankfurt, Fed. Rep. of Germany

[73] Assignee: Hoechst Aktiengesellschaft, Fed. Rep. of Germany

[21] Appl. No.: 846,332

[22] Filed: Oct. 28, 1977

[30] Foreign Application Priority Data

Oct. 29, 1976 [DE] Fed. Rep. of Germany ....... 2649278

[51] Int. Cl.² ............................................ A21D 10/00
[52] U.S. Cl. .................................. 426/549; 426/661; 426/804
[58] Field of Search ............... 426/549, 653, 658, 661, 426/804; 536/102, 106, 111; 106/210

[56] References Cited

U.S. PATENT DOCUMENTS

| | | | |
|---|---|---|---|
| 3,219,455 | 11/1965 | Dubois | 426/549 |
| 3,652,294 | 3/1972 | Marotta | 426/549 |
| 3,966,990 | 6/1976 | Cremer et al. | 426/549 |
| 4,042,719 | 8/1977 | Ignacz | 426/804 |

*Primary Examiner*—Raymond N. Jones
*Assistant Examiner*—Elizabeth A. Hatcher
*Attorney, Agent, or Firm*—James E. Bryan

[57] ABSTRACT

This invention relates to a baked foodstuff containing an additive to prevent softening caused by moisture, wherein the additive is a carbohydrate derivative which has been modified by means of heat energy, radiation or an additional chemical compound and which is water-insoluble to the extent of at least about 25% by weight, and is capable of swelling. The invention also relates to a process for the preparation of the baked foodstuff.

3 Claims, No Drawings

PROCESS OF PREPARING A BAKED FLOUR-CONTAINING PRODUCT

The present invention relates to a baked foodstuff with an additive to prevent the softening caused by moisture.

In many cases it is of interest to those who prepare a baked foodstuff not only in the bakery and confectionery trade and in large-scale establishments for producing bread, biscuits, pretzels and the like but also on a small scale, for example at home, that no softening or only minor softening of their product occurs even upon prolonged storage. The following may be mentioned as examples of the various causes of this softening.

Baked foodstuffs which come into contact with moist toppings or fillings often absorb quite considerable amounts of liquid from the latter. These baked foodstuffs include, in particular, flan cases and pastry cases for fruit tarts, and also ice cream wafers or other baked foodstuffs which enclose ice cream or are covered with ice cream and which become moistened through very quickly when the ice cream melts.

In flan cases and pastry cases for fruit tarts, the juice issuing from the fruit, liquid ingredients of a so-called soft icing or other moist fillings or toppings not only effect a moistening through of the case but, in addition, the texture of the baked foodstuff is softened by the absorption of moisture. This softening impairs, for example, the mechanical strength of the baked food to such an extent that such pieces of cake can be transported only with difficulty, or can no longer be transported, without damage, such as breaking up, cracking, disintegrating and the like. Furthermore, upon extensive softening the flavor of the baked food is adversely affected.

The measures hitherto proposed to counteract excessively rapid moistening through and softening of baker's goods have only a limited effectiveness. When preparing a foodstuff to be baked from shortcrust pastry, for example, it is possible to make very solid baked goods in which the penetration of moisture occurs relatively slowly so that the strength is retained for a certain period. It is a disadvantage in this case that upon early consumption the structure of the baked goods, which is then still very solid, is felt to be not very pleasant. Another possibility for both baked goods of shortcrust pastry and those of biscuit mixture is to place a rice paper which has a low permeability for moisture, onto or under the baked goods (see, for example, German Pat. No. 2,048,263). In this case, however, it is a disadvantage that moisture can collect on a rice paper placed onto the baked article, if a topping or a filling gives out significant amounts of moisture; on the other hand, a rice paper placed below the baked article does not prevent the baked goods from moistening through, but only prevents a break-through of moisture onto the base.

In the manufacture and storage of ice cream wafers or other baked foodstuffs which enclose ice cream or are covered with ice cream, similar problems arise. As long as the ice cream is frozen, for example, the wafers, into which the ice cream has been filled or which enclose the ice cream, remain dry and solid. However, as a result of the heat flux from the surroundings, especially at the points where the wafer is held, it is precisely at the contact points between the wafer and the ice cream that the latter first melts. The liquid formed on melting of the ice cream thus rapidly softens the wafers through so that the latter then lose their mechanical stability. At very high temperatures of the ambient air, at which the ice cream melts faster, it already becomes impossible or very difficult within a very short period to transport the ice cream in the wafer, as a result of the effects mentioned.

In the case of certain baked goods which keep, such as rusks, crispbread, hard biscuits, dry wafers and products for nibbling, such as pretzels, sticks, crackers and the like, exchange phenomena with the surroundings also occur, for example after crispbread or crackers have been covered with a moist spread or upon storage when moisture is absorbed; this also applies to the storage of those products for nibbling which are prepared from a dough and are inflated to a porous texture by strong heating with steam (for example peanut flips).

The consumer expects these products to be hard and brittle, i.e., they break off at the point of biting when they are bitten off and they do not yield elastically. Hitherto this property was obtained only when the products had a very low water content over a certain period of time. The baked goods and products for nibbling which have been mentioned and have the intended low water content are, however, hygroscopic so that, already upon storage, they attract and absorb water from the ambient air which always has a certain water content. This absorption of water vapor then has the result that the desired brittleness of the product is lost. Consequently, however, it is not only the reduced strength of the baked goods mentioned which the consumer feels to be rather unpleasant, but as a rule the flavor properties are also given a lower rating.

On the way from the producer to the consumer, this process admittedly can be prevented by a packaging of material which is impermeable to water vapor, but the absorption of water from the ambient air which contains water vapor starts when the packaging is damaged or deliberately opened. Frequently the contents of an opened package also are not completely consumed; the products which are then no longer protected from the absorption of water vapor thus become soft within a short period and then can be eaten by the consumer only with reduced enjoyment.

Accordingly, it is the object of the present invention to provide an improved additive for a baked foodstuff, which additive prevents the softening of the foodstuff caused by absorbed moisture.

The invention starts from a baked foodstuff containing an additive to prevent the softening caused by moisture. The foodstuff according to the invention contains an additive which is a carbohydrate derivative, which has been modified by means of heat energy, radiation or an additional chemical compound, and which is water-insoluble to the extent of at least about 25% by weight and is capable of swelling.

In preferred embodiments of the invention, the modification is crosslinking and the modified carbohydrate derivative is a starch ether or cellulose ether.

Among the known modified carbohydrate derivatives, the following, for example, are particularly suitable: alkali metal salts of carboxymethyl cellulose which are treated by heat and which are capable of swelling in water, according to U.S. Pat. No. 2,639,239; in the process for the manufacture of this product, the solubility of a water-soluble alkali metal salt of carboxymethyl cellulose having a D.S. (=degree of substitution, i.e., the number of substituted hydroxyl groups on one anhydro-D-glucose unit) of 0.5 up to about 1 is reduced by subjecting this dry salt, in the finely divided form, to a temperature of about 130° to about 210° C., gel particles with a high swelling capability being obtained.

Water-insoluble, heat-treated carboxyalkyl celluloses, which absorb and retain liquids, according to U.S. Pat. No. 3,723,413 (=DT-OS No. 2,314,689); in the process for the manufacture of these products the procedure is that (a) cellulose materials are treated with carboxyalkylating reactants and in this way water-soluble carboxyalkyl cellulose is formed which has an average degree of substitution of more than 0.35 carboxyalkyl groups per anhydroglucose unit in the cellulose but which possesses poor properties with respect to the absorption and retention of liquids, (b) such a proportion of the carboxyalkylating reactants and the by-products formed during the reaction is removed that, relative to the weight of the water-soluble carboxyalkyl cellulose, at least about 3% by weight thereof remain and (c) the carboxyalkyl cellulose is subjected to a heat treatment in the presence of the remaining carboxyalkylating reactants and byproducts of the reaction and, thus, is rendered water-insoluble and excellent properties with respect to the absorption and retention of liquids are imparted to the carboxylalkyl cellulose.

Absorbent carboxymethyl cellulose fibers which are suitable for use in fiber materials for absorbing and retaining aqueous solutions and are substantially water-insoluble, according to U.S. Pat. No. 3,589,364 (=DT-OS No. 1,912,740); fibers of this type are composed of wet-crosslinked fibers of water-soluble salts of carboxymethyl cellulose having a D.S. of about 0.4 to 1.6 and possess the original fiber structure. Preferably, about 3–10% by weight of epichlorohydrin is employed as the crosslinking agent.

Chemically crosslinked cellulose ethers which are capable of swelling, according to U.S. Pat. No. 3,936,441 (=DT-OS No. 2,357,079); these crosslinked cellulose ethers, in particular those obtained from carboxymethyl cellulose, carboxymethyl hydroxyethyl cellulose, hydroxyethyl cellulose, or methyl hydroxyethyl cellulose, are manufactured by reacting the ethers which in themselves are water-soluble, in an alkaline reaction medium with a crosslinking agent, the functional groups of which are the acrylamido group CH$_2$=CH—C—$\overline{\text{N}}$—
$\phantom{\text{the acrylamido group CH}_2\text{=CH—}}\|\phantom{.}|$
$\phantom{\text{the acrylamido group CH}_2\text{=CH—}}(O)$ the chloro-azomethine group —$\overline{\text{N}}$=C— or
$\phantom{\text{the chloro-azomethine group —N=C—}}|$
$\phantom{\text{the chloro-azomethine group —N=C—}}\underline{(Cl)}$ the allyloxy-azomethine group —$\overline{\text{N}}$=C—$\overline{\text{O}}$—2—CH=CH$_2$
$\phantom{\text{the allyloxy-azomethine group —N=C—}}|$ or which is dichloroacetic acid or phosphorus oxychloride.

Chemically modified cellulose ethers which are capable of swelling, according to U.S. Pat. No. 3,965,091 (=DT-OS No. 2,358,150); these cellulose ethers which have not been modified by crosslinking are manufactured by reacting the ethers, which in themselves are water-soluble, in an alkaline reaction medium with a monofunctionally reacting compound which is described by one of the two general formulae:

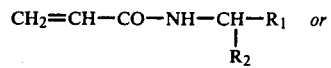

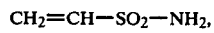

wherein R$_1$ in the formula I denotes the hydroxyl group, an acylamino group or an esterified carbamino group, and R$_2$ denotes hydrogen or the carboxyl group.

Chemically crosslinked cellulose ethers, which are capable of swelling, according to DT-OS No. 2,519,927; these crosslinked cellulose ethers are manufactured by reacting the ethers, which in themselves are water-soluble, in an alkaline reaction medium with bis-acrylamido acetic acid as the crosslinking agent.

Free-flowing, hydrophilic carbohydrates, which are crosslinked by radiation and are capable of swelling in water, according to DT-AS No. 2,264,027; these products are manufactured by (a) mixing at least one water-soluble, pulverulent polymeric carbohydrate with such an amount of at least one pulverulent inert filler, the particles of which are smaller than those of the carbohydrate, and in such a way that a substantial part of the surface of the pulverulent carbohydrate is covered, (b) while the mixing is continued, contacting the mixture, while stirring thoroughly, with a finely divided water spray in such an amount that the mixture is preserved in the form of free-flowing particles and (c) then subjecting the resulting mixture to ionizing radiation until the polymeric carbohydrate is crosslinked.

Chemically crosslinked or otherwise modified starch ethers, which are capable of swelling, according to German patent application No. P 26 34 539.1; these special starch ethers are manufactured by, for example, carrying out, as the modification, a crosslinking using a crosslinking agent which carries the following functional group which is reactive towards hydroxyl groups:

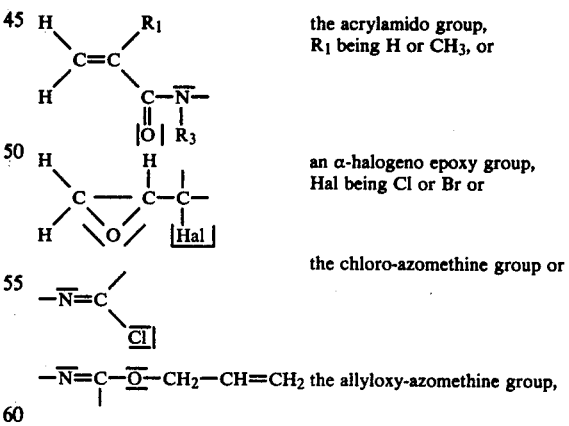

or which is phosphorus oxychloride. The procedure in another mode of manufacture is that the modification is carried out using a compound which is monofunctionally reactive under the stated conditions towards the hydroxyl groups of starch or of the starch ether and which is described by one of the general formulae which follow:

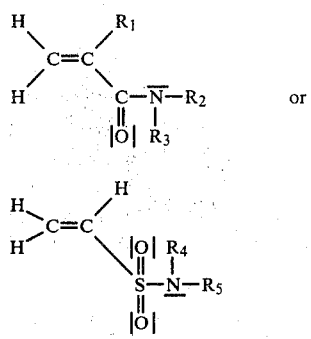

$R_1$ being $CH_3$ or H, $R_2$ being H, and $R_3$ being $CH_3$, $CH_2$—OH, an N—methylene-acylamido group with 1 to 3 C atoms, an esterified N-methylene-carbamido or N-carboxymethylene-carbamido group with 2 to 7 C atoms, or $R_2$ and $R_3$ being $CH_3$ or $CH_2$—OH, and $R_4$ and $R_5$ being H, or $R_4$ being H and $R_5$ being $CH_3$, or $R_4$ and $R_5$ being $CH_3$.

The modified carbohydrate derivatives used in the foodstuff according to the invention are compatible with the customary base materials and auxiliaries used in the bakery trade; for example, this applies to compatibility with fats, common salt, sugar, sweeteners, flavoring substances, preservatives and antioxidants.

The procedure for manufacturing the foodstuff according to the invention can be as follows. The modified carbohydrate derivatives are worked into the mixture during the required preparation of the mixture for manufacturing these foodstuffs. This procedure succeeds not only when the modified carbohydrate derivatives are employed in a preswollen state induced by water but, surprisingly, they also can be homogeneously worked into the mixture in the dry form.

In one of the preferred embodiments for the manufacture of the foodstuff according to the invention, the modified carbohydrate derivatives are added to the total quantity of the mixture, uniformly distributed therein and the whole is then baked through. Appropriately, the quantity of additive is then in the range from about 0.05 to about 15% by weight, preferably from about 0.2 to 10% by weight, relative to the total weight of the mixture. In these ranges, the addition of modified carbohydrate derivative does not impair the appearance, smell and taste of the foodstuff after it has been baked through. In the case of values in the medium and/or upper part of the range, however, it is possible that, depending upon the type of mixture, a somewhat more solid textural structure is obtained.

In another of the preferred embodiments for manufacturing the foodstuff according to the invention, the modified carbohydrate derivatives are added only to a partial amount of the mixture, uniformly distributed in this partial amount, combined with the remainder of the mixture as a top layer, interlayer and/or base layer to give the shape which is to be baked through and the whole is baked through. Appropriately, the quantity of additive is in the range from about 0.1 to 25% by weight, relative to the weight of mixture in the partial amount. Accordingly, it also can be employed in substantially greater quantities, compared with the uniform distribution over the entire mixture, because in the case of a thinner layer, a solidification of the textural structure is more acceptable without excessively affecting the total result. The last mentioned process is preferably used for the manufacture of flan cases and pastry cases for fruit tarts. In the case of adding larger proportions, or of the upper values of the indicated widest range of additive, of modified carbohydrates, it is possible to increase the proportion of water or milk in the mixture if it is intended to obtain a similar workability of the mixture compared with a mixture without additive. However, the solidification which results without the increased proportion of moisture under the stated conditions also can be desired. Above all, this is the case when the additive is mixed on its own into a partial amount of the mixture. It is then possible not only to prevent softening by means of a relatively high proportion of additive, or at least to delay the time of softening, but also to achieve this, in part, by the choice of a mixture which in itself is already more solid.

The use of mixtures of different types in a product which is to be baked through, is possible in particular when the mixtures have similar baking properties and the mixture with the higher specific density is placed, for baking through, below that having the lower specific density.

Thus, the surprising result of the addition of the modified carbohydrate derivatives which are capable of swelling, is that liquid penetrating into a baked foodstuff cannot be uniformly distributed therein but remains localized, for example in a restricted layer at the points of contact with the moist topping, a filling or an ice cream. The thickness of this layer in which the liquid remains localized, increases only slowly under a heavy liquid load. This effect of localization also can be observed, in a particularly surprising manner, in the case of very porous baked goods which, as the result of a type of sponge action, can absorb certain amounts of moisture even without special additives.

In the case of baker's goods which keep and of products for nibbling, the fragile-brittle behavior of the baked foodstuff can be preserved for much longer than in the case when these are prepared without an addition of modified carbohydrates which are capable of swelling. It is possible that the specially added particles absorb the moisture from the surroundings at a higher rate relative to the remainder of the baked goods and thus appear to retain the moisture, without early softening of the baked goods as a whole occurring.

The absorption and retention of moisture in a restricted layer is particularly pronounced if it is not the total volume of the baked foodstuff which is uniformly provided with the modified carbohydrate derivative capable of swelling, but if the modified carbohydrate derivative capable of swelling is added only to a partial amount of the mixture before baking through and this partial amount is then baked through as a layer, together with the remainder of the mixture. In multi-layer baked articles a wide dry layer of baked material then still remains preserved under a high liquid load even if baked articles without the additive according to the invention already discharge the added moisture quantitively to a base.

The foodstuffs according to the invention are physiologically acceptable.

EXAMPLE 1 (COMPARATIVE EXAMPLE)

A mixture is prepared from 1.35 kg of wheat flour, 1.10 kg of sugar, 5 g of sodium bicarbonate, 2.5 g of common salt, 10 eggs and 1 l of milk.

A part of the mixture is baked through directly to give thin hard biscuits; baking time about 20 to 25 minutes, baking temperature about 180° to 200° C.

EXAMPLE 2

Thin biscuits are likewise prepared under the conditions of Example 1 from a part of the mixture prepared according to Example 1, with the addition of about 2%, relative to the total amount of mixture, of a thermally crosslinked carboxymethyl starch which was uniformly worked into the mixture. With regard to the parameters of appearance, smell and taste, there is no difference compared with the biscuits prepared according to Example 1. When both types of biscuit are stored at room temperature in moist ambient air, the biscuits prepared without the additive already exhibit a noticeable softening after about half a week, while the biscuits prepared with the additive still have very good strength after two weeks.

EXAMPLE 3

The procedure followed is as in Example 2 but using hydroxyethyl cellulose crosslinked by epichlorohydrin. The results correspond to the biscuits prepared according to Example 2.

EXAMPLE 4

The procedure followed is as in Example 2 but using carboxymethyl cellulose modified by N-methylolacrylamide. The results correspond to the biscuits prepared according to Example 2.

EXAMPLE 5

The procedure followed is as in Example 2 but using methylcellulose crosslinked by dichloroacetic acid. The results correspond to the biscuits prepared according to Example 2.

EXAMPLE 6 (COMPARATIVE EXAMPLE)

A shortcrust pastry is prepared from 1.2 kg of wheat flour, 0.8 kg of margarine, 0.4 kg of sugar, 4 g of common salt and 4 eggs.

This mixture is baked through until it has completely solidified, and the finished cake thus prepared is used as a comparison with the cakes prepared in accordance with the examples which follow; the baking temperature is about 180° to 200° C.

EXAMPLE 7

6 g of thermally crosslinked carboxymethyl cellulose are uniformly worked into the mixture of the composition of Example 6 and the mixture is baked through under the conditions of Example 6; a difference in taste is not detectable and the texture is uniformly solid.

EXAMPLE 8

The procedure followed is as in Example 7 but using 30 g of thermally crosslinked carboxymethyl cellulose. The result corresponds to the cake prepared in accordance with Example 7.

EXAMPLE 9

The procedure followed is as in Example 7 but using 60 g of thermally crosslinked carboxymethyl cellulose. A difference in taste compared with the cake of Example 6 is not detectable but the texture is more solid.

EXAMPLE 10

Slices 2 cm thick are cut out of the cakes of Examples 6 to 9. The surface of these pieces is uniformly moistened with equal portions or water until the piece of baked goods, to which no thermally crosslinked carboxymethyl cellulose has been added, starts to discharge moisture to a filter paper placed below. Subsequently, an assessment is made as to how deep the moisture has penetrated into each of the pieces of baked goods:

| Time of observation | Number of mm of the 20 mm thick pieces of baked goods, which are still dry | | | |
|---|---|---|---|---|
| | Example 6 | Example 7 | Example 8 | Example 9 |
| 1 | 0 | 15–16 | 17–18 | 18–19 |
| 2 | 0 | about 12 | 16–17 | about 18 |

(Time 1: control after thorough moistening of the comparative piece without additive, according to Example 6
Time 2: 2 hours after time 1).

The moistening through of the total piece of cake thus decreases as the quantity of additive increases, i.e., the proportion of cake which remains dry, rises. The moist layer is particularly soft in the cake prepared according to Example 9.

EXAMPLE 11 (comparative example)

A biscuit mixture is prepared from 750 g of sugar, 500 g of wheat flour, 500 g of starch, 200 ml of water, 20 eggs, and 25 g of baking powder.

This mixture is baked through until it has completely solidified and the finished cake thus prepared serves as a comparison with the cakes prepared in accordance with the examples which follow; baking temperature about 180° to 200° C.

EXAMPLE 12

500 g are taken from a mixture prepared in accordance with Example 11 and 5 g of methylcellulose crosslinked with epichlorohydrin are uniformly worked into this partial amount. The quantity of mixture with the additive is placed on the base of a baking tin, the other partial amount of the mixture without the additive is placed in a layer immediately above the former and the whole is baked through under the conditions of Example 11. A division of layers is no longer detectable in the finished cake and the texture is uniformly spongy.

EXAMPLE 13

The procedure followed is as in Example 12 but using 50 g of methyl cellulose crosslinked with epichlorohydrin. A division of layers can be detected in the finished cake because the lower layer provided with the additive has a comparatively more solidified texture.

EXAMPLE 14

2 cm thick slices of equal weight are cut out of the cakes of Examples 11 to 13 in such a way that the layer to which the modified methyl cellulose has been added is contained therein in its entire partial layer thickness. The surface of these pieces is moistened, from the side containing the additive, with equal portions of water until the piece of baked goods without the additive (according to Example 11) starts to discharge water to a filter paper placed below. The piece of baked goods of Example 13 absorbs the water at a somewhat lower rate than the pieces of baked goods of Examples 11 and 12.

Then an assessment is made as to how deep the moisture has penetrated into each of the pieces of baked goods:

| Time of observation | Number of mm of the 20 mm thick pieces of baked goods, which are still dry | | |
|---|---|---|---|
| | Example 11 | Example 12 | Example 13 |
| 1 | 0 | about 16 | only a small part of the layer containing the additive is moist, the layer without additive remains completely dry |
| 2 | 0 | 12–14 | |

(Time 1: control after thorough moistening of the comparative piece without additive, according to the Example 11
Time 2: 2 hours after time 1).

Thus, with a very large amount of additive, virtually no moisture passes into that part of the cake which has no additive.

EXAMPLE 15 (comparative example)

A shortcrust pastry mixture and a biscuit mixture are prepared in accordance with the procedure of Examples 6 and 11 respectively. The shortcrust pastry mixture is placed in a thin layer into a baking tin, three times the amount of biscuit mixture is placed on top as a layer and the whole is baked through at about 180° to 200° C. until it has completely solidified. In the finished cake two layers can be clearly recognized but the cohesion of the layers is good.

EXAMPLE 16

Before baking, hydroxyethyl cellulose crosslinked with N,N′-methylene-bis-acrylamide in an amount of 1% by weight, relative to the proportion of shortcrust pastry mixture, is uniformly worked into the shortcrust pastry mixture in a two-layer cake baked through in accordance with Example 15. In appearance and taste the result corresponds to the cake prepared in accordance with Example 15.

EXAMPLE 17

The procedure followed is as in Example 16, using 10% by weight of hydroxyethyl cellulose crosslinked with N,N′-methylene-bis-acrylamide. In appearance and taste the result approximately corresponds to the cake prepared in accordance with Example 16.

EXAMPLE 18

2.5 cm thick slices of equal weight are cut out of the two-layer cakes of Examples 15 to 17 in such a way that they contain the full thickness of the layer of shortcrust pastry mixture but, in addition, also a part of the biscuit mixture. The shortcrust pastry mixture layer of these slices is moistened with equal portions of water until the piece of baked goods of Example 15 (without additive) starts to discharge water to a filter paper placed below, through the biscuit layer present in the lower part. Then an assessment is made as to how deep the moisture has penetrated into each of the pieces of baked goods:

| Time of observation | Proportion of cake which is moistened through or is still dry | | |
|---|---|---|---|
| | Example 15 | Example 16 | Example 17 |
| 1 | completely moist | the entire shortcrust pastry mixture layer is moist | moist only in the upper part of the shortcrust pastry mixture layer |
| 2 | completely moist | already a small discharge of moisture to the adjacent part of the biscuit mixture layer | moist only in the upper part of the shortcrust pastry mixture layer |

(Time 1: control after thorough moistening of the comparative piece without additive, according to Example 15
Time 2: 2 hours after time 1).

Thus, with a relatively high proportion of additive, virtually no moisture passes into that part of the cake which is free from additive.

EXAMPLE 19 (comparative example)

A mixture suitable for the manufacture of ice cream wafers is prepared from 1.35 kg of wheat flour, 1.1 kg of sugar, 12 g of $NaHCO_3$, 2.5 g of common salt, 10 eggs and 1 l of milk.

The mixture is baked through in a thin layer at about 180° to 200° C. until it has completely solidifed and the finished wafers thus prepared are used as a comparison with the wafers prepared according to the examples which follow.

EXAMPLE 20

Carboxymethyl starch crosslinked with 1,4-dichlorobut-2-ene, in an amount of about 1% by weight, relative to the total amount of mixture, is uniformly worked into the mixture of the composition of Example 19 and the mixture is baked through under the conditions of Example 19. The wafer thus obtained has the same appearance and taste as a wafer prepared according to Example 19.

EXAMPLE 21

The procedure followed is as in Example 20 but using 10% by weight of carboxymethyl starch crosslinked with 1,4-dichloro-but-2-ene. The wafer obtained is somewhat more solid and has a slightly lighter color than the comparative wafers of Examples 19 and 20.

EXAMPLE 22

Slices of equal size are cut out of the wafers of Examples 19 to 21. The surface of these slices is uniformly moistened with equal portions of water until the piece of wafer without additive (according to Example 19) starts to discharge water to a filter paper placed below. Then the strength of the pieces of wafer is investigated:

| Time of observation | Strength of the moistened piece of wafer according to | | |
|---|---|---|---|
| | Example 19 | Example 20 | Example 21 |
| 1 | completely moist, soft | partially still solid | partially still solid |
| 2 | very soft | almost moistened through, no longer solid | only partially moistened through, still rather solid |

(Time 1: control after moistening through of the comparative piece without additive, according to Example 19
Time 2: 2 hours after time 1).

Thus, with a relatively large proportion of additive, virtually no complete moistening through of the piece of wafer occurs so that the storage life of the wafer is increased.

It will be obvious to those skilled in the art that many modifications may be made within the scope of the present invention without departing from the spirit thereof, and the invention includes all such modifications.

What is claimed is:

1. A process for the preparation of a baked flour-containing product containing an additive to prevent softening caused by moisture, comprising
   (a) forming a mixture comprising flour and water,
   (b) adding the additive in an amount of about 0.05 to 15% by weight, relative to the total weight of mixture, uniformly distributing the additive in said flour and water mixture and then baking the mixture, or
   (c) adding the additive in an amount of about 0.1 to 25% by weight relative to the weight of said mixture in a partial amount, to a partial amount of said mixture, uniformly distributing the additive in this partial amount, combining said partial amount as a top layer, interlayer and/or base layer with the remainder of the mixture to provide a shape which is to be baked, and then baking the whole,
   said additive being a carbohydrate derivative selected from the group consisting of a cross-linked starch ether, and a cross-linked cellulose ether, said ethers being cross-linked by means of heat energy, radiation, or an additional chemical compound, and being water-insoluble to the extent of at least about 25% by weight, and capable of swelling.

2. A process as claimed in claim 1 wherein the partial amount, which is to be combined with the additive, of the mixture has a composition other than that of the remaining amount.

3. A process as claimed in claim 1 wherein the amount of additive is about 0.2 to 10% by weight, relative to the total weight of the mixture.

* * * * *